United States Patent [19]

Morishita et al.

[11] Patent Number: 4,467,968
[45] Date of Patent: Aug. 28, 1984

[54] ROTARY TYPE ELECTROSTATIC SPRAY PAINTING DEVICE

[75] Inventors: Teru Morishita, Shizuoka; Satoshi Ohtawa, Mishima; Yoshimichi Ishioka, Susono; Toshikazu Suzuki, Toyota, all of Japan

[73] Assignee: Toyota Jidosha Kogyo Kabushiki Kaisha, Toyota, Japan

[21] Appl. No.: 302,452

[22] Filed: Sep. 15, 1981

[30] Foreign Application Priority Data

Mar. 4, 1981 [JP] Japan ................................ 56-29949

[51] Int. Cl.$^3$ .............................................. B05B 5/04
[52] U.S. Cl. ........................................ 239/703; 308/10
[58] Field of Search ........................... 239/700–703, 239/223, 224; 308/9, 10, DIG. 1

[56] References Cited

U.S. PATENT DOCUMENTS

| | | | |
|---|---|---|---|
| 1,906,715 | 5/1933 | Penick | 308/DIG. 1 X |
| 3,063,642 | 11/1962 | Point | |
| 3,083,911 | 4/1963 | Griffiths | |
| 3,121,533 | 2/1964 | Sedlacsik, Jr. | |
| 3,128,045 | 4/1964 | Gauthier | |
| 3,130,066 | 4/1964 | Brady | |
| 3,155,539 | 11/1964 | Juvinall | 118/11 |
| 3,248,606 | 4/1966 | Fraser | |
| 3,281,076 | 10/1966 | Burnside et al. | 239/7 |
| 3,504,851 | 4/1970 | Demeter | |
| 3,512,502 | 5/1970 | Drum | 118/624 |
| 3,620,581 | 11/1971 | Heller et al. | 308/9 |
| 3,873,024 | 3/1975 | Probst | |
| 3,985,405 | 10/1976 | Okano et al. | 308/DIG. 1 X |
| 4,128,280 | 12/1978 | Purtschert | 308/DIG. 1 X |
| 4,148,932 | 4/1979 | Tada et al. | 239/700 X |
| 4,378,091 | 3/1983 | Morishita et al. | 239/703 |

FOREIGN PATENT DOCUMENTS

| | | | |
|---|---|---|---|
| 122508 | 10/1946 | Australia | 308/10 |
| 2336181 | 7/1977 | France | 239/703 |
| 1213959 | 11/1970 | United Kingdom | 308/9 |

Primary Examiner—Andres Kashnikow
Attorney, Agent, or Firm—Kenyon & Kenyon

[57] ABSTRACT

A rotary type electrostatic spray painting device comprising a rotary shaft and a spray cup-shaped head fixed onto the front end of the rotary shaft. Paint is fed onto a cup-shaped inner wall of the spray head. The rotary shaft is supported by a single thrust air bearing, a pair of radial air bearings, and a non-contact type rotary shaft supporting device having a permanent magnet. The permanent magnet is arranged near a circumferential outer wall of a hollow portion of the rotary shaft for supporting the rotary shaft by the attracting force of the permanent magnet. An electrode, continuously contacting the rear end of the rotary shaft, is provided. A negative high voltage is applied to the housing of the paint device. In addition, the negative high voltage is also applied to the spray head via the electrode and the rotary shaft.

21 Claims, 8 Drawing Figures

ROTARY TYPE ELECTROSTATIC SPRAY PAINTING DEVICE

BACKGROUND OF THE INVENTION

The present invention relates to a rotary type electrostatic spray painting device.

One known electrostatic spray painting device which has been used for painting, for example, the bodies of motor cars, is of the rotary type comprises a rotary shaft supported by ball bearings or roller bearings arranged within the housing of the painting device. A cup shaped spray head is fixed onto the front end of the rotary shaft. In this painting device, a negative high voltage is applied to the spray head, and paint is fed onto the inner circumferential wall of the spray head. Thus, fine paint particles charged with electrons are sprayed from the spray head and are attracted by an electrostatic force onto the surface of the body of a motor car, which is grounded. As a result of this, the surface of the body of a motor car is painted. In such a rotary type electrostatic spray painting device, about 90 percent of the paint sprayed from the spray head, can be efficiently used for painting the surface to be painted. Thus, the consumption of the paint is small and, as a result, rotary type electrostatic spray painting devices are used in various industries.

In order to form a beautifully finished surface, it is necessary to reduce the size of the particles of paint as much as possible. In rotary-type spray painting devices the paint is divided into fine particles by using the centrifugal force caused by the rotation of the spray head. The strength of the centrifugal force, which corresponds to the rotating speed of the spray head, has a great influence on the size of the particles of paint. In other words, the higher the rotating speed of the spray head, the smaller the size of the particles of paint. Consequently, in order to form a beautifully finished surface by using a rotary type electrostatic spray painting device, it is desirable to increase the rotating speed of the spray head as much as possible. In a conventional rotary type electrostatic spray painting device, ball bearings or roller bearings are used for supporting the rotary shaft of the electrostatic spray painting device and, in addition, a lubricant, such as grease, is confined within the bearings. However, when such grease-lubricated bearings are rotated at a high speed, the bearings instantaneously deteriorate. Therefore, in a conventional rotary type electrostatic spray painting device which uses bearings which are lubricated by grease, the maximum rotating speed of the rotary shaft is at most approximately 20,000 r.p.m. However, in the case wherein the rotating speed of the spray head is about 20,000 r.p.m., the size of the particles of paint is relatively large, and it is therefore difficult to form a beautifully finished surface. The painting process for the bodies of motor cars comprises a primary spraying step, an undercoating step, and a finish painting step. However, since it is difficult to form a beautifully finished surface by using a conventional rotary type electrostatic spray painting device, as mentioned above, such a spray painting device is used for carrying out the undercoating step, but cannot be used for carrying out the finish painting step.

One known system for lubricating ball and roller bearings injects lubricating oil of a low viscosity into the region between the inner race and the outer race of the ball or roller bearing. In this manner, the friction between the ball or roller and such races is greatly reduced and, at the same time, the heat caused by the friction is absorbed by the lubricating oil. In situations where the above-mentioned jet lubricating system is applied to a rotary type electrostatic spray painting device, it is possible to increase the rotating speed of the rotary shaft of the electrostatic spray painting device over device where grease lubricated bearings are used. However, since the jet lubricating system requires a complicated and bulky lubricating oil feed arrangement, it is particularly difficult to apply such a jet lubricating system to a rotary type electrostatic spray painting device. In addition, if the lubricating oil mixes with the paint, the appearance of the painted surface is damaged. It is practically impossible to prevent the lubricating oil from leaking into the paint and, thus, it is inadvisable to apply the jet lubricating system to a rotary type electrostatic spray painting device.

A known electrostatic spray painting device which is capable of reducing the size of the particles of paint to a great extent divide the paint into fine particles by injecting a stream of air. In this air injection type electrostatic spray painting device, since the size of the particles of sprayed paint can be reduced to a great extent, as mentioned above, it is possible to form a beautifully finished surface. Consequently, the air injection type electrostatic spray painting device has been used for carrying out the finish painting step for the bodies of motor cars. It is a problem with known air injection type electrostatic spray painting devices that the sprayed paint impinges upon the surface to be painted together with the stream of the injection air and therefore a substantial portion of the sprayed paint escapes into the atmosphere with the stream of the injection air. The amount of the paint which adheres to the surface to be painted is only about 40 percent of the paint sprayed from the electrostatic spray painting device. Consequently, air injection type electrostatic spray painting devices suffer from the problem that the consumption of the paint is inevitably increased. A further problem occurs in that the paint which escapes with the stream of the injection air, causes air pollution within factories.

It is, therefore, an object of the present invention to provide an improved rotary type electrostatic spray painting device which reduces the size of the particles of paint which are sprayed and reduces the quantity of paint which is used.

SUMMARY OF THE INVENTION

According to the present invention, there is provided a rotary type electrostatic spray painting device which comprises a metallic housing; a metallic rotary shaft rotatably arranged in the housing and having a front end and a rear end; a cup-shaped metallic spray head fixed onto the front end of the rotary shaft and having a cup-shaped inner wall; feeding means for feeding a paint onto the cup-shaped inner wall; drive means cooperating with the rotary shaft for rotating the rotary shaft; and a pair of non-contact type radial bearings arranged in the housing and cooperating with the rotary shaft for radially supporting the rotary shaft under a non-contacting state. In accordance with the invention, permanent magnet means are arranged near a circumferential outer wall of the rotary shaft and fixed onto the housing at a position located above the rotary shaft and between the radial bearings, at least a portion of the rotary shaft, which faces the permanent magnet means, is made of a ferromagnetic material. A terminal is provided for receiving a negative high voltage, the terminal being connected to the housing. Also an electrode is arranged in the housing for electrically connecting the terminal to its spray head.

The present invention may be more fully understood from the description of preferred embodiments of the invention set forth below, together with the accompanying drawings.

DESCRIPTION OF PREFERRED EMBODIMENTS

Figure 1:
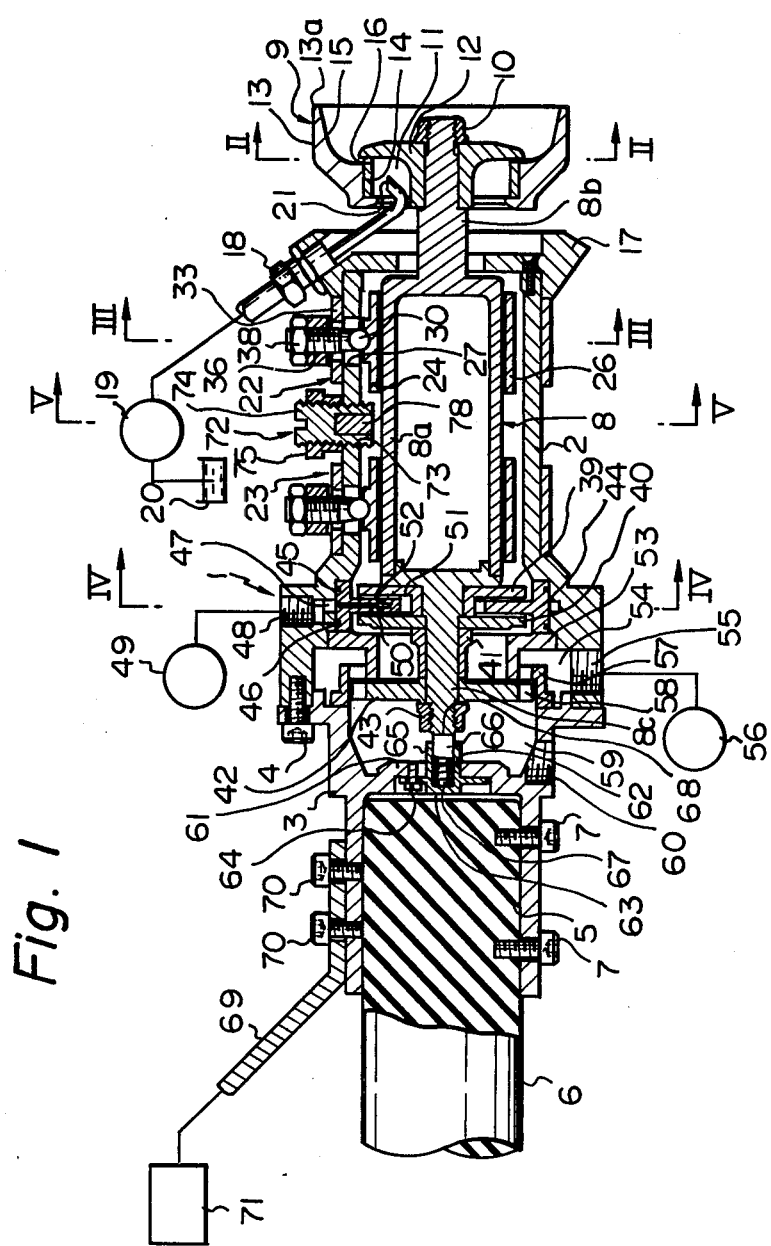
FIG. 1 is a cross-sectional side view of an embodiment of a rotary type electrostatic spray paint device according to the present invention.
Figure 2:
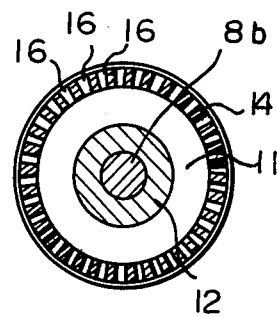
FIG. 2 is a cross-sectional view taken along the line II—II in FIG. 1.

Referring to FIG. 1, a rotary type electrostatic spray painting device, generally designated by reference numeral 1, comprises a generally hollow cylindrical front housing 2 made of metallic material, and a generally hollow cylindrical rear housing 3 made of metallic material. The front housing 2 and the rear housing 3 are firmly joined to each other by bolts 4. A support rod 6 which is made of electrically insulating material is fitted into a cylindrical hole 5 formed in the rear housing 3, and this rear housing 3 is fixed onto the support rod 6 by bolts 7. The support rod 6 is supported by a base (not shown). A rotary shaft 8, made of a ferromagnetic material, is inserted into the front housing 2. This rotary shaft 8 comprises a hollow cylindrical portion 8a located in the middle thereof, a shaft portion 8b formed in one piece on the front end of the hollow cylindrical portion 8a, and a shaft portion 8c fixed onto the rear end of the hollow cylindrical portion 8a. A spray head 9 made of metallic material is fixed onto the shaft portion 8b of the rotary shaft 8 by a nut 10. The spray head 9 comprises a spray head supporting member 12 forming therein an annular space 11, and a cup-shaped spray head body 13 fixed onto the spray head supporting member 12. As illustrated in FIGS. 1 and 2, a plurality of paint outflow bores 16, each opening into the annular space 11 and smoothly connected to an inner wall 15 of the spray head body 13, is formed in an outer cylindrical portion 14 of the spray head supporting member 12. As illustrated in FIG. 1, an end plate 17 is fixed onto the front end of the front housing 2, and a paint injector 18 is mounted on the end plate 17. The paint injector 18 is connected to a paint reservoir 20 via a paint feed pump 19, and a nozzle 21 of the paint injector 18 is directed to the cylindrical inner wall of the outer cylindrical portion 14 of the spray head supporting member 12.

Figure 3:
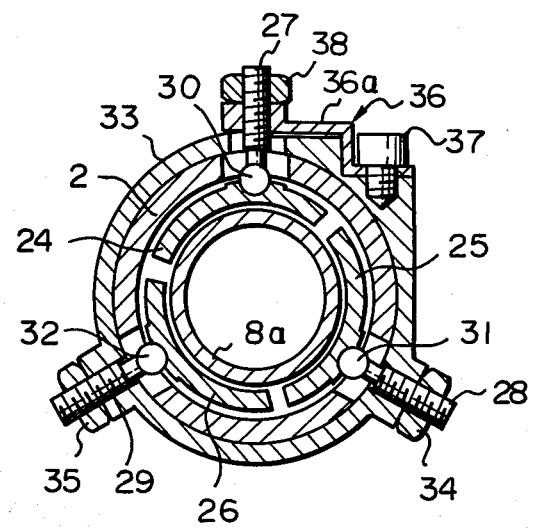
FIG. 3 is a cross-sectional view taken along the line III—III in FIG. 1.

A pair of non-contact type tilting pad radial air bearings 22 and 23 is arranged in the front housing 2, and the rotary shaft 8 is rotatably supported on the front housing 2 via a pair of the tilting pad radial air bearings 22 and 23. Both the tilting pad radial air bearings 22 and 23 have the same construction and, therefore, the construction of only the tilting pad radial air bearing 22 will be hereinafter described. Referring to FIGS. 1 and 3, the tilting pad radial air bearing 22 comprises three pads 24, 25, 26 spaced from the outer circumferential wall of the hollow cylindrical portion 8a of the rotary shaft 8 by an extremely small distance, and three support pins 27, 28, 29 supporting the pads 24, 25, 26, respectively. Spherical tips 30, 31, 32 are formed in one piece on the inner ends of the support pins 27, 28, 29, and are in engagement with spherical recesses formed on the rear faces of the pads 24, 25, 26, respectively. Consequently, the pads 24, 25, 26 can swing about the corresponding spherical tips 30, 31, 32, each functioning as a fulcrum. A bearing support frame 33 is fixed onto the outer circumferential wall of the front housing 2 by means of, for example, bolts (not shown), and the support pins 28, 29 are fixed onto the bearing support frame 33 by means of nuts 34, 35, respectively. In addition, one end of a support arm 36 having a resilient plate shaped portion 36a is fixed onto the bearing support frame 33 by means of a bolt 37, and the other end of the support arm 36 is fixed onto the support pin 27 by means of a nut 38. Consequently, the pad 24 is urged onto the hollow cylindrical portion 8a of the rotary shaft 8 due to the resilient force of the support arm 36.

Figure 4:
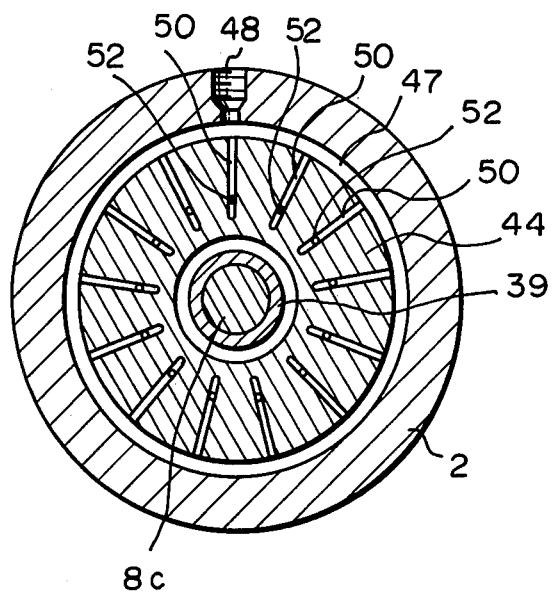
FIG. 4 is a cross-sectional view taken along the line IV—IV in FIG. 1.

Turning to FIG. 1, a pair of disc shaped runners 39, 40 is inserted into the shaft portion 8c of the rotary shaft 8 and fixed onto the shaft portion 8c via a spacer 41 and a turbine wheel 42 by means of a nut 43. A stationary annular plate 44 is arranged between the runners 39 and 40, and the runners 39, 40 and the annular plate 44 construct a non-contact type thrust air bearing. As illustrated in FIG. 1, each of the runners 39, 40 is spaced from the annular plate 44 by a slight distance. The annular plate 44 is fixed onto the front housing 2 via a pair of O-rings 45, 46. As illustrated in FIGS. 1 and 4, an annular groove 47, extending along the outer circumferential wall of the annular plate 44, is formed on the inner wall of the front housing 2 and connected to an air feed pump 49 via a compressed air supply hole 48 which is formed in the front housing 2. A plurality of air passages 50, each extending radially inwardly from the annular groove 47, is formed in the annular plate 44. In addition, a plurality of air outflow bores 51, each extending towards the runner 40 from the inner end portion of the corresponding air passage 50, is formed in the annular plate 44, and a plurality of air outflow bores 52, each extending towards the runner 39 from the inner end portion of the corresponding air passage 50, is formed in the annular plate 44.

As illustrated in FIG. 1, a turbine nozzle holder 53 is fixed onto the front housing 2 at a position adjacent to the annular plate 44 and an annular air supply chamber 54 is formed between the turbine nozzle holder 53 and the front housing 2. The air supply chamber 54 is connected to a compressor 56 via a compressed air supply hole 55. The air supply chamber 54 comprises a compressed air injecting nozzle 57 having a plurality of guide vanes (not shown), and turbine blades 58 of the turbine wheel 42 are arranged to face the compressed air injecting nozzle 57. A housing interior chamber 59, in which the turbine wheel 42 is arranged, is connected to the atmosphere via a discharge hole 60 which is formed in the rear housing 3. The compressed air fed into the air supply chamber 54 from the compressor 56 is injected into the housing interior chamber 59 via the compressed air injecting nozzle 57. At this time, the compressed air injected from the injecting nozzle 57 provides the rotational force for the turbine wheel 42 and, thus, the rotary shaft 8 is rotated at a high speed. Then, the compressed air injected from the injecting nozzle 57 is discharged to the atmosphere via the discharge hole 60.

A through-hole 62 is formed on an end wall 61 of the rear housing 3, which defines the housing interior chamber 59, and an electrode holder 63 extending through the through hole 62 is fixed onto the end wall 61 by means of bolts 64. A cylindrical hole 65 is formed coaxially with the rotation axis of the rotary shaft 8 in the electrode holder 63, and a cylindrical electrode 66, made of wear resisting materials such as carbon, is inserted into the cylindrical hole 65 so as to be movable therein. In addition, a compression spring 67 is inserted between the electrode 66 and the electrode holder 63 so that the tip face 68 of the electrode 66 is urged onto the end face of the shaft portion 8c of the rotary shaft 8 due to the spring force of the compression spring 67. An external terminal 69 is fixed onto the outer wall of the rear housing 3 by means of bolts 70 and connected to a high voltage generator 71 used for generating a negative high voltage ranging from −60 kV to −90 kV. Consequently, the negative high voltage is applied to both the front housing 2 and the rear housing 3, and it is also applied to the spray head 9 via the electrode 66 and the rotary shaft 8. Since electrode 66 is at least partially disposed in chamber 59, it is subjected to the cooling effect of the compressed air as it flows through chamber 59 toward discharge hole 60.

In operation, paint is injected from the nozzle 21 of the paint injector 18 onto the circumferential inner wall of the outer cylindrical portion 14 of the spray head supporting member 12. Then, the paint which is injected onto the circumferential inner wall of the outer cylindrical portion 14 flows out onto the inner wall 15 of the spray head body 13 via the paint outflow bores 16 due to the centrifugal force caused by the rotation of the spray head 9. After this, the paint spreads on the inner wall 15 of the spray head body 13 and flows on the inner wall 15 in the form of a thin film. Then, the paint reaches the tip 13a of the spray head body 13. As mentioned previously, a negative high voltage is applied to the spray head 9. Consequently, when the paint is sprayed from the tip 13a of the spray head body 13 in the form of fine particles, the particles of the sprayed paint are charged with electrons. Since the surface to be painted is normally grounded, the paint particles charged with electrons are attracted towards the surface to be painted due to electrical force and, thus, the surface to be painted is painted.

As mentioned previously, the rotary shaft 8 is supported by a pair of tilting pad radial air bearings 22, 23 and a single thrust air bearing which is constructed by the runners 39, 40 and the stationary annular plate 44. In the tilting pad radial air bearings 22, 23, when the rotary shaft 8 is rotated, ambient air is sucked into the extremely small clearances formed between the hollow cylindrical portion 8a and the pads 24, 25, 26. Then, the air thus sucked is compressed between the hollow cylindrical portion 8a and the pads 24, 25, 26 due to a so-called wedge effect of air, and therefore, the pressure of the air between the hollow cylindrical portion 8a and the pads 24, 25, 26 is increased. As a result of this, the force radially supporting the rotary shaft 8 is generated between the hollow cylindrical portion 8a and the pads 24, 25, 26. On the other hand, in the above-mentioned thrust air bearing, compressed air is fed into the air passages 50 from the air feed pumps 49 via the annular groove 47. Then, the compressed air is injected from the air outflow bores 51 into the clearance between the annular plate 44 and the runner 40, and also, injected from the air outflow bores 52 into the clearance between the annular plate 44 and the runner 39. As a result of this, the pressure, which is necessary to maintain the above-mentioned clearances formed on each side of the annular plate 44, is generated between the annular plate 44 and the runners 39, 40. Consequently, the rotary shaft 8 is supported by the thrust air bearing and a pair of the radial air bearings under a non-contacting state via a thin air layer. As is known to those skilled in the art, the coefficient of viscosity of air is about one thousandth of that of the viscosity of lubricating oil. Consequently, the frictional loss in the air bearing, which uses air as a lubricant, is extremely small. Therefore, since the amount of heat caused by the occurrence of the frictional loss is extremely small, it is possible to increase the rotating speed of the rotary shaft 8 to a great extent. In the embodiment illustrated in FIG. 1, it is possible to rotate the rotary shaft 8 at a high speed of about 80,000 r.p.m.

Figure 5:
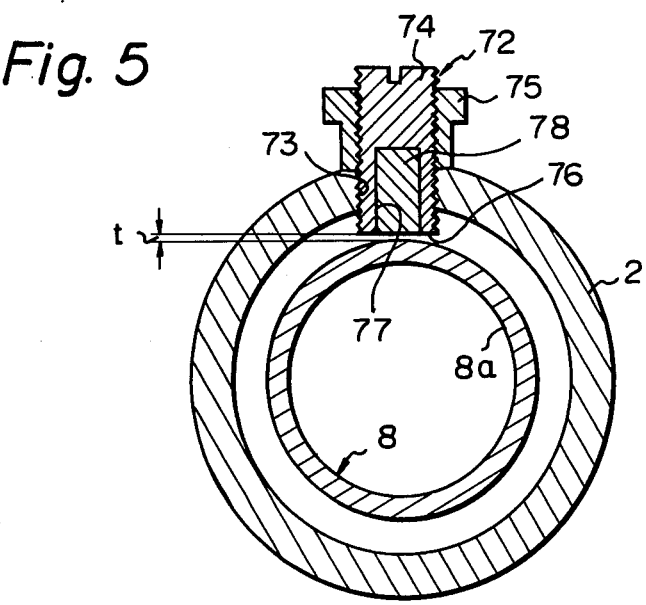
FIG. 5 is a cross-sectional view taken along the line V—V in FIG. 1.
Figure 6:
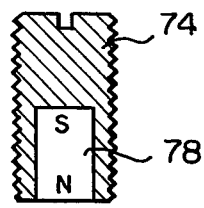
FIG. 6 is a cross-sectional side view of the holder of a non-contact type rotary shaft supporting device.

In the tilting pad radial air bearing 22 in which the entire outer circumferential wall of the rotary shaft 8 is not enclosed by a continuous bearing surface as illustrated in FIG. 3, since it is possible to maintain the stable creation of a thin air layer between the rotary shaft 8 and the pads 24, 25, 26 until the rotating speed of the rotary shaft 8 is increased to a great extent, it is advisable to apply the tilting pad radial air bearing to a rotary shaft rotating at a high speed. In addition, it is also advisable to apply a foil bearing (not shown) to a rotary shaft rotating at a high speed. Consequently, in the present invention, instead of using the tilting pad radial air bearing 22, such a foil bearing may be used. However, in such a tilting pad radial air bearing and a foil bearing, when the rotary shaft 8 is stopped or the rotating speed of the rotary shaft 8 is extremely low, since the force, supporting the rotary shaft 8, is not produced between the bearing and the rotary shaft 8, the rotary shaft 8 comes into contact with the bearing. Therefore, if the starting and the stopping of the rotation of the rotary shaft 8 are repeated, the rotary shaft 8 comes into contact with the bearing everytime the rotation of the rotary shaft 8 is stopped or started. As a result of this, the bearing wears. In an air bearing such as the tilting pad radial air bearing and the foil bearing, even a slight wear of the bearing has a great influence on the performance of the bearing. Consequently, in the case wherein such an air bearing is used for supporting the rotary shaft 8, it is necessary to prevent the rotary shaft 8 from coming into contact with the bearing. To this end, in the rotary type electrostatic spray painting device according to the present invention, as illustrated in FIG. 1, a non-contact type rotary shaft supporting device 72, using the attracting force of a permanent magnet, is arranged on the front housing 2 at a position located above the rotary shaft 8 and between the tilting pad air bearings 22 and 23. As illustrated in FIGS. 1 and 5, the rotary shaft supporting device 72 comprises a holder 74 screwed into a threaded hole 73 formed in the front housing 2, and a nut 75 screwed onto the holder 74 and serving to prevent the holder 74 from being loosened. The holder 74 is firmly fixed onto the front housing 2 by nutting the holder 74. A blind bore 77 is coaxially formed on the lower end face 76 of the holder 74, and a permanent magnet 78 is inserted and fixed into the blind bore 77. The permanent magnet 78 is so arranged that, for example, the polarity of the upper portion of the permanent magnet 78 is "S", and the polarity of the lower portion of the permanent magnet 78 is "N" as illustrated in FIG. 6. As illustrated in FIG. 5, the lower end face of the permanent magnet 78 is positioned in almost the same plane as that of the holder 74 and spaced from the circumferential outer wall of the rotary shaft 8 by a distance t. This distance t is larger than the clearance between the circumferential outer wall of the rotary shaft 8 and the pads 24, 25, 26 and, thus, there is no danger that the permanent magnet 78 and the holder 74 come into contact with the rotary shaft 8. As mentioned above, since the rotary shaft 8 is made of a ferromagnetic material, the upward attracting force acts on the rotary shaft 8 due to the permanent magnet 78 and, thus, the rotary shaft 8 is supported by the attracting force of the permanent magnet 78. Even if the rotation of the rotary shaft 8 is stopped, the supporting force of the rotary shaft 8, which is caused by the attracting force, acts on the rotary shaft 8. Consequently, it is possible to prevent the rotary shaft 8 from coming into contact with the tilting pad radial air bearings 22, 23. It is preferable that the distance t between the rotary shaft 8 and the permanent magnet 78 be suitably adjusted in accordance with a using state of the spray painting device 1, that is, a tilting degree of the spray painting device 1.

Figure 7:
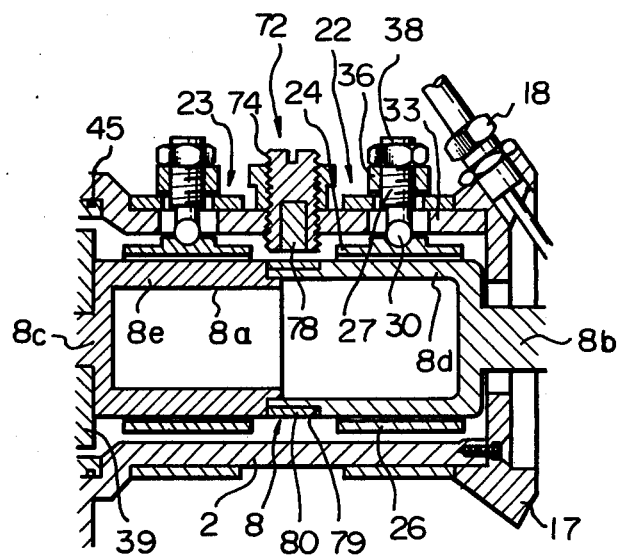
FIG. 7 is a cross-sectional side view of a portion of an alternative embodiment of a rotary type electrostatic spray painting device according to the present invention.

FIG. 7 illustrates another embodiment. In this embodiment, the rotary shaft 8 is made of a non-magnetic material, and the hollow cylindrical portion 8a of the rotary shaft 8 comprises a hollow cylindrical portion 8d formed in one piece on the shaft portion 8b, and a hollow cylindrical portion 8e formed in one piece on the shaft portion 8c. The inner end of the hollow cylindrical portion 8d is fitted into and fixed onto the inner end of the hollow cylindrical portion 8e. In addition, an annular groove 79 is formed on the circumferential outer wall of the inner end of the hollow cylindrical portion 8d, and a ring member 80, made of a ferromagnetic material, is fitted into and fixed onto the annular groove 79. Consequently, in this embodiment, the attracting force of the permanent magnet 78 acts on the ring member 80 and, thereby, the rotary shaft 8 is supported. In both the embodiments hereinbefore described, it is preferable that a rare earth cobalt magnet be used as the permanent magnet 78.

Figure 8:
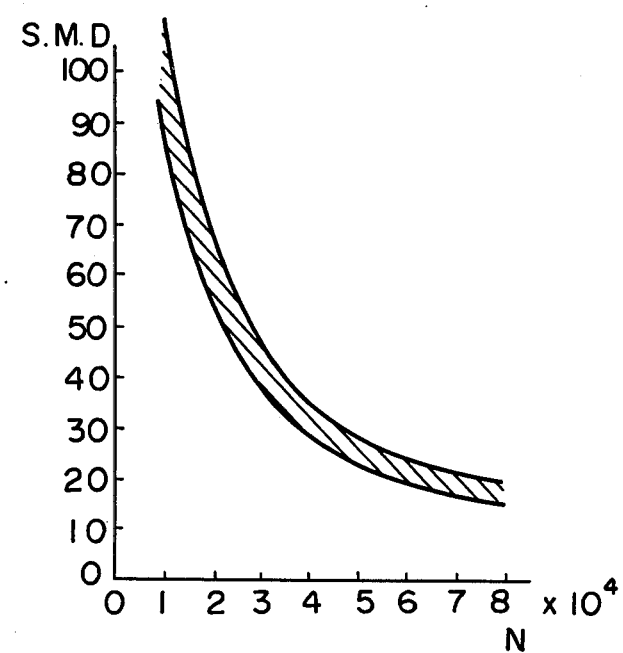
FIG. 8 is a graph showing the relationship between the size of paint particles and the rotating speed of the spray head.

FIG. 8 illustrates the relationship between the size of the particles of sprayed paint and the rotating speed of the spray head in the case wherein the spray head 9 (FIG. 1) having a diameter of 75 mm is used. In FIG. 8, the ordinate S.M.D. indicates the mean diameter ($\mu$m) of paint particles, which is indicated in the form of a Sauter mean diameter, and the abscissa N indicates the number of revolutions per minute (r.p.m.) of the spray head 9. As mentioned previously, in a conventional rotary type electrostatic spray painting device, the maximum number of revolutions per minute N of the spray head is about 20,000 r.p.m. Consequently, from FIG. 8, it will be understood that, if the spray head having a diameter of 75 mm is used in a conventional rotary type electrostatic spray painting device, the minimum mean diameter S.M.D. of paint particles is in the range of 55 $\mu$m to 65 $\mu$m. Contrary to this, in the present invention, the maximum number of revolutions per minute N is about 80,000 r.p.m. Consequently, from FIG. 8, it will be understood that the paint can be divided into fine particles to such a degree that the mean diameter S.M.D. of paint particles is in the range of 15 $\mu$m to 20 $\mu$m. Therefore, it will be understood that, in a rotary type electrostatic spray painting device according to the present invention, the size of paint particles can be greatly reduced, as compared with that of paint particles in a conventional rotary type spray painting device. In addition, as mentioned previously, the same negative high voltage is applied to the housings 2, 3 and the rotary shaft 8. Consequently, there is no danger that an electric discharge will occur between the housings 2, 3 and the rotary shaft.

According to the present invention, since the spray head can be rotated at a high speed of about 80,000 r.p.m., the size of the particles of sprayed paint can be reduced to a great extent. As a result of this, the size of paint particles becomes smaller than that of paint particles obtained by using a conventional air injection type electrostatic spray painting device. Consequently, in the present invention, it is possible to obtain an extremely beautiful finished surface and, therefore, a rotary type electrostatic spray painting device can be used for carrying out a finish painting step in the paint process, for example, for bodies of motor cars. In addition, in the present invention, since paint particles are created by rotating the spray head at a high speed, but are not created by air injection, the amount of the paint used to effectively paint the surface to be painted is about 90 percent of the amount of the paint sprayed from a rotary type electrostatic spray painting device. Consequently, since a large part of the sprayed paint is not dispersed within the factory, it is possible to prevent the problem of air pollution from arising. In addition, the amount of paint used can be reduced. Furthermore, when the rotation of the rotary shaft is stopped or when the rotating speed of the rotary shaft becomes extremely low, since the rotary shaft does life time of the radial bearings can be lengthened over a prior art.

While the invention has been described by reference to specific embodiments chosen for purposes of illustration, it should be apparent that numerous modifications could be made thereto by those skilled in the art without departing from the basic concept and scope of the invention.

We claim:
1. A rotary type electrostatic spray painting device comprising:
   a metallic housing;
   a metallic rotary shaft arranged in said housing, said metallic rotary shaft having a front solid portion, a rear solid portion, and a hollow portion arranged coaxially with, and intermediate of, said front and rear solid portions, said hollow portion having a diameter which is larger than respective diameters of said front and rear solid portions;
   a cup-shaped metallic spray head fixed onto a front end of said front solid portion of said metallic rotary shaft and having a cup-shaped inner wall;
   feeding means for feeding a paint onto said cup-shaped inner wall;

drive means cooperating with said metallic rotary shaft for rotating said metallic rotary shaft;

a pair of non-contact type radial bearings arranged in said metallic housing and cooperating with said hollow portion of said metallic rotary shaft for radially supporting said metallic rotary shaft under a non-contacting state;

permanent magnet means arranged near a circumferential outer wall of said hollow portion of said metallic rotary shaft and mounted on said metallic housing at a position on only one side of said shaft located in the vicinity of only a circumferential portion of said hollow portion of said metallic rotary shaft between said pair of non-contact type radial bearings for applying a substantially unidirectional radial attractive magnetic force to said metallic rotary shaft which counteracts at least a portion of a gravitational force acting on said metallic rotary shaft when the housing is oriented so that the rotary shaft is substantially horizontal and the magnet means is disposed above the shaft, said circumferential portion of said hollow portion of said metallic rotary shaft being made of a ferromagnetic material;

adjustment means for adjusting the radial distance between said permanent magnet means and said ferromagnetic circumferential portion of the metallic rotary shaft, said adjustment means being accessible from the exterior of said metallic housing;

terminal means for receiving a negative high voltage, said terminal means being electrically connected to said metallic housing; and electrode means arranged in said metallic housing for electrically coupling said terminal means to said cup-shaped metallic spray head.

2. A rotary type electrostatic spray painting device as claimed in claim 1, wherein the entirety of said metallic rotary shaft is made of a ferromagnetic material.

3. A rotary type electrostatic spray painting device as claimed in claim 1, wherein said circumferential portion of said hollow portion of said metallic rotary shaft comprises a ring member made of a ferromagnetic material and fixed onto said circumferential outer wall of said hollow portion of said metallic rotary shaft which is in the vicinity of said permanent magnet means.

4. A rotary type electrostatic spray painting device as claimed in claim 3, wherein said hollow portion of said metallic rotary shaft further comprises a first hollow cylindrical portion supported by one of said non-contact type radial bearings and having an inner end, and a second hollow cylindrical portion supported by the other of said non-contact type radial bearings and having an inner end which is interconnected to the inner end of said first hollow cylindrical portion, an annular groove being formed on a circumferential outer wall of the inner end of said first hollow cylindrical portion, said ring member being fitted into said annular groove.

5. A rotary type electrostatic spray painting device as claimed in claim 1, wherein said adjustment means comprises a holder adjustably fixed onto said metallic housing, and said permanent magnet means comprises a permanent magnet supported by said holder and arranged to face a circumferential outer wall of said hollow portion of said metallic rotary shaft.

6. A rotary type electrostatic spray painting device as claimed in claim 5, wherein said metallic housing has a threaded hole formed thereon, and said holder is screwed into said threaded hole, said adjustment means comprising a nut which is screwed onto said holder in contact with the outside of said housing for preventing said holder from being loosened.

7. A rotary type electrostatic spray painting device as claimed in claim 5, wherein said holder has a blind bore formed therein, and said permanent magnet is fitted into said blind bore.

8. A rotary type electrostatic spray painting device as claimed in claim 1, wherein each of said non-contact type radial bearings is an air bearing.

9. A rotary type electrostatic spray painting device as claimed in claim 8, wherein each of said air bearings comprises a bearing frame connected to said metallic housing, a plurality of pads, each having an inner face which extends along a circumferential outer wall of said hollow portion of said metallic rotary shaft by a slight distance, and a plurality of support pins, each being connected to said bearing frame and pivotally supporting a corresponding one of said pads.

10. A rotary type electrostatic spray painting device as claimed in claim 9, wherein each of said air bearings further comprises a resilient arm through which one of said support pins is connected to said bearing frame for biasing said corresponding pad to said circumferential outer wall of said hollow portion of said metallic rotary shaft.

11. A rotary type electrostatic spray painting device as claimed in claim 9, wherein each of said pads has an outer wall forming a spherical recess thereon, each of said support pins having a spherical tip which is in engagement with the spherical recess of said corresponding pad.

12. A rotary type electrostatic spray painting device as claimed in claim 1, wherein said device comprises non-contact type thrust bearing means arranged in said metallic housing and cooperating with said metallic rotary shaft for axially supporting said metallic rotary shaft under a non-contacting state.

13. A rotary type electrostatic spray painting device as claimed in claim 12, wherein said non-contact type thrust bearing means comprises a thrust air bearing.

14. A rotary type electrostatic spray painting device as claimed in claim 13, wherein said non-contact type thrust bearing means further comprises an air feed pump for producing compressed air, said thrust air bearing comprising a stationary annular plate having opposed side walls, and a pair of runners fixed onto said rotary shaft and arranged on each side of said annular plate, each of said runners being spaced from the corresponding side wall of said annular plate, a plurality of air outflow bores connected to said air feed pump being formed on the opposed side walls of said annular plate.

15. A rotary type electrostatic spray painting device as claimed in claim 14, wherein said annular plate forms therein a plurality of radially extending air passages, each connecting said corresponding air outflow bore to said air feed pump.

16. A rotary type electrostatic spray painting device as claimed in claim 1, wherein said electrode means comprises an electrode which is arranged to contact electrically with a rear end of said rear solid portion of said metallic rotary shaft.

17. A rotary type electrostatic spray painting device as claimed in claim 16, wherein said electrode is made of carbon.

18. A rotary type electrostatic spray painting device as claimed in claim 16 wherein said rear end of said rear solid portion of said metallic rotary shaft has a flat end face extending perpendicular to a rotation axis of said metallic rotary shaft, said electrode being arranged coaxially with said rotation axis of said metallic rotary shaft and having a flat end face which is in contact with said flat end face of said rear end of said metallic rotary shaft.

19. A rotary type electrostatic spray painting device as claimed in claim 16, wherein said electrode means further comprises an electrode holder fixed onto metallic said housing and having therein a cylindrical hole, into which said electrode is slidably inserted, and a compression spring arranged in the cylindrical hole of said electrode holder between said electrode holder and said electrode.

20. A rotary type electrostatic spray painting device as claimed in claim 1, wherein said drive means comprises a compressor, an air injection nozzle arranged in said metallic housing and connected to said compressor, and a turbine wheel fixed onto said metallic rotary shaft and having a turbine blade which is arranged to face said air injection nozzle.

21. A rotary type electrostatic spray painting device as claimed in claim 1, wherein said cup-shaped metallic spray head comprises a cylindrical inner wall arranged coaxially with a rotation axis of said metallic rotary shaft and defining therein an annular space, a plurality of paint outflow bores being formed in said cylindrical inner wall of said cup-shaped metallic spray head and smoothly connected to said cup-shaped inner wall of said cup-shaped metallic spray head, said feed means having a paint injection nozzle which is arranged in said annular space.

* * * * *

UNITED STATES PATENT AND TRADEMARK OFFICE
CERTIFICATE OF CORRECTION

PATENT NO.  : 4,467,968
DATED       : August 28, 1984
INVENTOR(S) : Morishita et al.

It is certified that error appears in the above—identified patent and that said Letters Patent is hereby corrected as shown below:

Column 2, line 7, change "device" to --devices--.

Column 11, line 9, after "onto" insert --said--.

Column 11, line 10, before "housing" delete --said--.

Signed and Sealed this

Twelfth Day of March 1985

[SEAL]

Attest:

DONALD J. QUIGG

*Attesting Officer*    *Acting Commissioner of Patents and Trademarks*